Feb. 2, 1960 P. D. MERRILL 2,923,561
SECTIONAL ANCHOR RING FOR BELL JOINT CLAMP
Filed Feb. 9, 1953 3 Sheets-Sheet 1
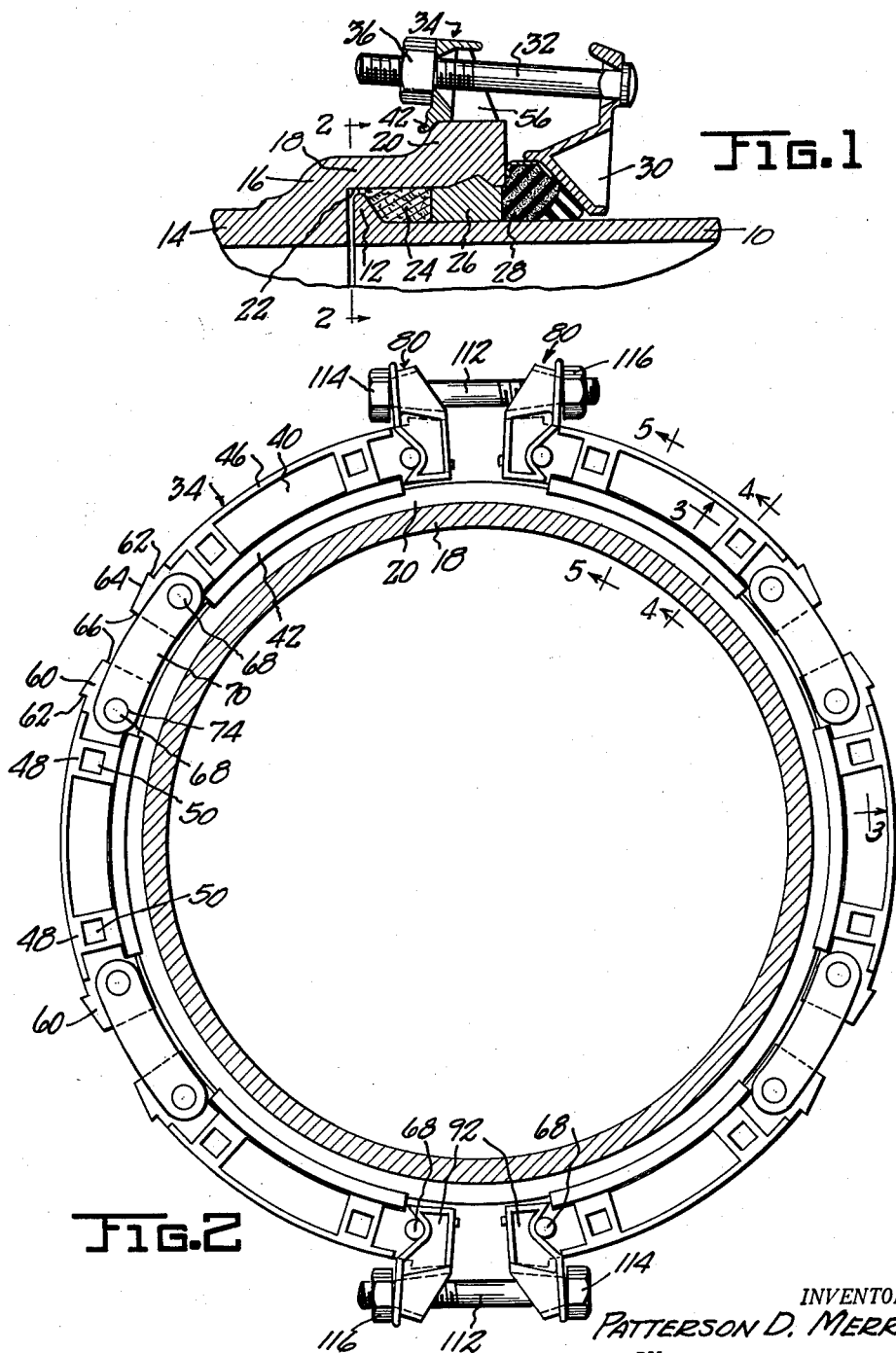
INVENTOR.
PATTERSON D. MERRILL.
BY
Eugene C. Knoblock.
ATTORNEY.

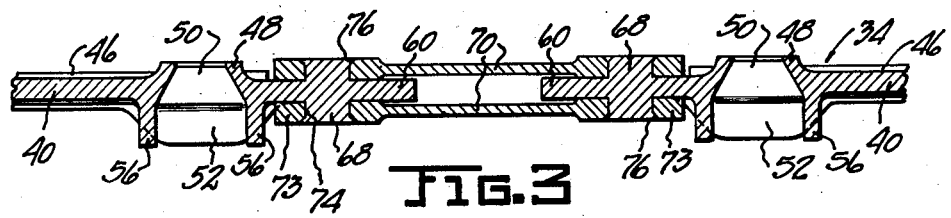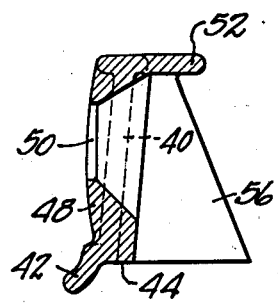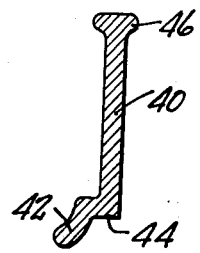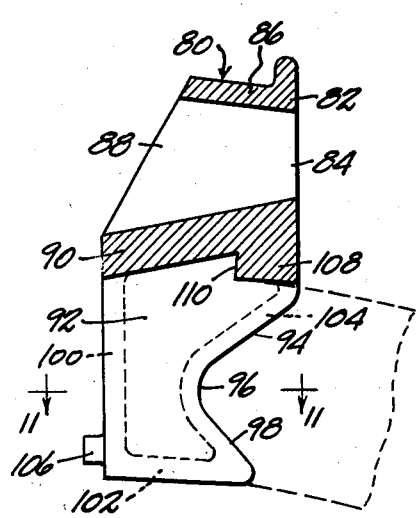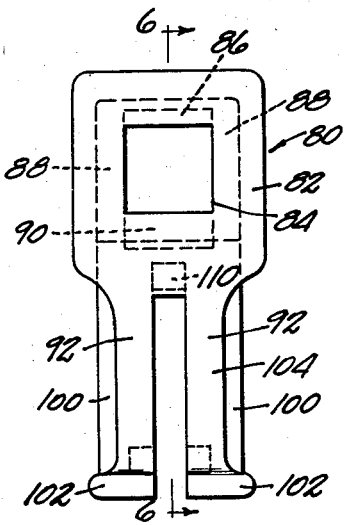
INVENTOR.
PATTERSON D. MERRILL
BY
Eugene C. Knoblock
ATTORNEY.

INVENTOR.
PATTERSON D. MERRILL.
BY
Eugene C. Knoblock
ATTORNEY.

United States Patent Office 2,923,561
Patented Feb. 2, 1960

2,923,561

SECTIONAL ANCHOR RING FOR BELL JOINT CLAMP

Patterson D. Merrill, South Bend, Ind., assignor to M. B. Skinner Company, South Bend, Ind., a corporation of Indiana Application February 9, 1953, Serial No. 335,715

2 Claims. (Cl. 285—413)

This invention relates to a sectional anchor ring for bell joint clamps. More particularly, it relates to a ring adapted to be mounted upon the bell of a pipe at a bell and spigot joint to provide anchorage against which draw bolts may operate to hold a gasket pressing ring in operative relation to a gasket for sealing a pipe leak at a bell and spigot joint.

The usage of large pipes, that is, pipes having a diameter of 14 inches or more, is increasing in pipelines for oil, gas and other liquids and fluids. These lines are frequently manufactured from pipe sections having bell and spigot joint connections at which leaks may develop. The conventional method of sealing such leaks is to apply a bell joint pipe leak sealing clamp at the leaking joint. Such clamps usually include an anchor ring encircling the pipe and bearing endwise against a flange or lip of the bell portion thereof, a gasket pressing ring encircling the other pipe section forming part of the joint to press a gasket against the end of the bell of the joint, and draw bolts extending between the gasket ring and the anchor ring and serving to draw the gasket ring toward the bell to press the gasket into sealing engagement with the pipe at the joint. The two rings, namely the anchor ring and the gasket ring, have usually been formed in two semi-circular parts connected together by bolts and nuts. The two-part construction of such rings is feasible in clamps for pipes having diameters of less than 14 inches. Where clamps are being prepared for pipes of diameters of 14 inches and greater, the semi-circular ring sections are no longer practical.

Clamp rings are commonly formed from malleable castings. These castings are hard and brittle as cast and before they are annealed. Experience has shown that the casting of semi-circular ring parts for pipes of 14 inches and greater in diameter is costly because the large size of the sections results in many defective castings. The percentage of acceptable castings may fall as low as ten percent of the total number of castings in such large sizes; hence attempts to cast semi-circular ring parts are quite wasteful and costly. The large size required, where the semi-circular castings are produced, presents another problem from the standpoint that only a comparatively small number of foundries have the equipment enabling them to mold the large size ring sections. Because of the difficulties of the work and the large amount of waste involved, the foundries equipped to do the work frequently do not wish to undertake it. Therefore, it is expedient to form the rings in more than two sections.

The formation of the rings in more than two sections introduces problems in that the anchor rings must be so mounted that the various sections thereof will not turn or yield relative to each other and, instead, must be maintained in a common plane. The anchor ring must be drawn up to maintain substantially uniform and continuous engagement with the bell portion of a bell and spigot joint regardless of variations of individual pipe sections from a normal or standard size. The individual sections should be uniform or similar in size and shape and must be so constructed that the ends thereof may be connected either to rigid connectors between sections or to releasable non-permanent connectors between sections. The rings should preferably be constructed from parts having substantially uniform wall thickness so as to avoid shrinkage of metal between heavy and thin parts, and the ring must provide adequate strength to insure that the application of the full force required to effect a seal at a sealing gasket will be successfully withstood.

It is the primary object of this invention to provide a sectional anchor ring construction which will satisfy all of the foregoing requirements.

A further object is to provide a sectional anchor ring formed of a plurality of similar sections, some of which are joined permanently by link members, and others of which are detachably joined by bolts bearing upon fixtures releasably engaging the ends of ring sub-assemblies.

A further object is to provide a ring formed of sections whose end portions are so constructed and arranged that each may be secured to a similar section end portion by rigid links serving to hold the ring sections in selected orientation or may mount fixtures to which draw bolts can be connected.

Other objects will be apparent from the following specification.

In the drawings:

Fig. 1 is a transverse sectional view of a pipe leak seal taken at line 4—4 of Fig. 2 and illustrating my improved anchor ring.

Fig. 2 is a face view of the ring as applied to a bell pipe portion and viewed along line 2—2 of Fig. 1, but with the draw bolts between the anchor ring and the gasket ring removed.

Fig. 3 is a fragmentary enlarged sectional view taken on line 3—3 of Fig. 2.

Fig. 4 is an enlarged sectional view taken on line 4—4 of Fig. 2.

Fig. 5 is an enlarged sectional view taken on line 5—5 of Fig. 2.

Fig. 6 is a sectional view of an end fixture taken on line 6—6 of Fig. 7.

Fig. 7 is an end view of the fixture shown in Fig. 6 as viewed from the right in Fig. 6.

Figure 8:
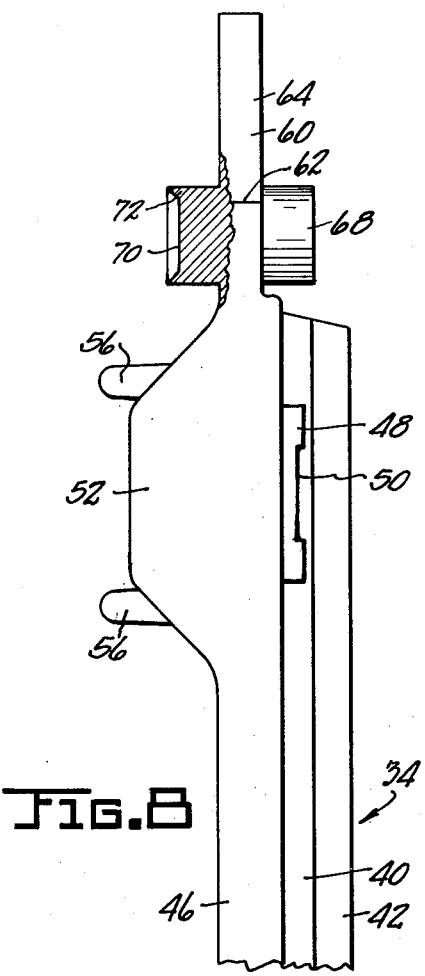
Fig. 8 is an enlarged edge view of the end portion of a ring as viewed from the outer or large diameter edge thereof.

Referring to the drawings which illustrate the preferred embodiment of the invention, the numeral 10 designates a pipe having a circumferential flange 12 at one end commonly referred to as the spigot end. At the opposite end the same pipe has a thickened wall portion 14 with which merges the outwardly projecting shoulder portion 16 of a bell 18 which terminates in an enlarged flange 20. The bore 22 of the bell will be of a diameter larger than the spigot flange 12. The spigot part of one pipe section will fit within the bore 22 of the other pipe section, as illustrated in Fig. 1, and a packing or sealing material 24 is positioned in the annular cavity between the parts 10 and 18 to seal the joint, said sealing material being held in place by an outer ring 26 of material, such as lead, which holds the sealing material in place.

When leaks occur at such a joint it is the common practice to employ a gasket ring 28 formed of rubber or like material and of substantially triangular construction which encircles the pipe 10 and bears against the end of the bell of the other pipe and against the seal retainer 26 at the joint. This sealing ring 28 is engaged by a gasket pressing ring 30 which encircles the pipe 10 to bear against the frusto conical surface of the sealing ring 28. The gasket engaging ring 30 is drawn toward the bell by draw bolts 32 which extend to an anchor ring 34 encircling the bell 18 and seating against the pipe flange 20. A nut 36 is threaded upon each draw bolt 34 and, upon rotation, acts to draw the gasket ring toward the bell.

This invention relates primarily to the anchor ring 34. The ring 34 is formed of a plurality of sections. As here shown, the ring has six sections and is preassembled in sub-assemblies in which three sections are joined together end to end by rigid links, and the ends of the sub-assemblies mount fixtures to releasably engage or anchor securing bolts. It will be understood that the ring may be formed from any number of sections desired or found suitable, and preferably will be formed of more than two sections. The ring sections are preferably similar in all structural and dimensional properties.

Each ring section has a web or wall portion 40 which normally defines a part of a frusto conical unit displaced at a slight angle from a plane perpendicular to the pipe 10. A flange 42 projects laterally and thence radially inwardly from the plate 40. In the normal arrangement of the parts, the inner edge surface 44 of the wall 40 is adapted to bear against the outer circumferential surface of the pipe flange 20, and the ring flange 42 is adapted to bear against the end face of that pipe flange 20, as best illustrated in Fig. 1. A second marginal flange 46 or enlargement is formed at the outer margin of the wall 40. The cross-sectional shape of the ring, as above described, is best illustrated in Fig. 5 with the displacement of the part 40 from true vertical being substantially the angle of displacement of said wall from a plane perpendicular to the axis of the pipe and of the assembled ring when mounted on a pipe.

In substantially equispaced relation from the opposite end of each section are provided offset wall portions 48, the same being offset from the wall 40 in the same direction that the flange 42 projects from said wall. The outer surface of each offset part 48, that is, the surface adjacent to the flange 42, is preferably slightly convex, as best illustrated in Fig. 4. Each offset 48 has an aperture 50 extending therein substantially centrally thereof and preferably rectangular or other non-circular shape. The marginal flange 46 of the ring is widened or enlarged at 52 adjacent to and in register with each offset portion 48 at the side thereof, or in a direction which is opposite the direction in which the offset 48 projects, and the inner edge surface 44 is preferably tapered and widened at 54 adjacent to the offset 48, as best seen in Fig. 9.

A pair of flanges or ribs 56 project laterally from the ring section at opposite sides of the opening 50 and in the same direction as the flange enlargement 52. The inner edges of these ribs 56 are preferably flush with the surface 44, 54, and at their outer ends the ribs 56 merge with the enlargement 52 of the outer marginal flange. The ribs 56 are adapted to engage and bear upon the outer circumferential surface of the flange 20 of the bell end of the pipe. The openings 50 are adapted to receive the draw bolts 32, and the surfaces 48 are adapted to be engaged by the nuts 36.

Each end of each section constitutes a flat plate portion 60 which lies in a plane at an angle to the plane of the wall portion 40, the same being substantially perpendicular to the axis of the ring and of the pipe when the ring is in place. The relation of the parts is such that the outer marginal portion of the wall 60 is preferably in line with the outer margin of the wall 40, but the inner marginal portion of the end wall 60 is laterally offset from the inner marginal portion of the wall 40 by an amount as represented by the flare of the part 54 and as best illustrated in Figs. 9 and 10.

Figure 9:
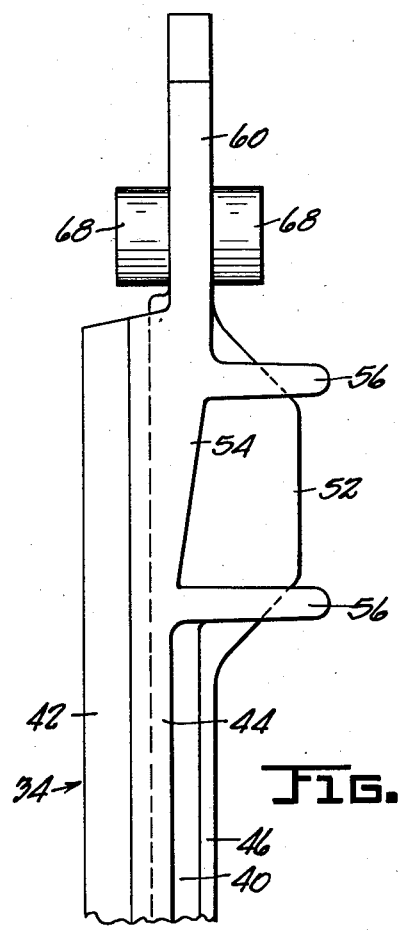
Fig. 9 is an edge view of the ring as viewed at the small diameter edge thereof.
Figure 10:
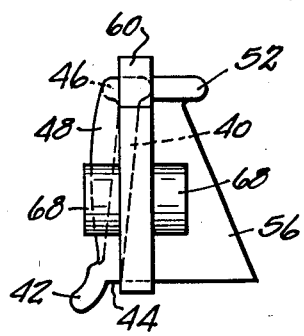
Fig. 10 is an end view of a ring section.

The flanges 42, 46 preferably terminate adjacent the inner end portion of each end part 60, as best illustrated in Figs. 2, 8 and 9. The outer edge of each end portion 60 is preferably configured, as best illustrated in Fig. 2, so as to provide a substantially radial shoulder 62 spaced from its end, the surface 64 between that shoulder and the end being tapered so that the width of the wall 60 at its tip is substantially the same as the width of the wall 60 inwardly of the shoulder 62. The end edges 66 of the wall parts 60 preferably extend substantially radially. At an intermediate portion of each wall part 60 is formed an integral substantially cylindrical lug 68, each of which lugs 68 has a recessed end 70 defined by a marginal annular tapered rib 72. The lugs 68 project substantially equally from opposite surfaces of the wall portion 60, and each thereof is substantially radially aligned with the adjacent shoulder surface 62, as best illustrated in Fig. 2.

A plurality of ring sections are permanently assembled together in a partial ring sub-assembly by means of rigid links 70 which are preferably arcuate and substantially flat and which preferably have thickened end portions 73 whose thickness is substantially equal to the spacing of the recessed end part 70 of each cylindrical lug 68 from the adjacent surface of the plate portion 60. Each thickened end portion is centrally apertured at 74 and the apertures are preferably countersunk at 76. Two adjacent ring sections are connected by means of two link units 70 arranged at opposite sides of the section ends 60, as illustrated in Fig. 3, with the lugs 68 fitting in the plate apertures. The lug ribs 72 are peened to fit in the countersunk portion 76 and thereby effect anchorage of the parts with the inner surfaces at the ends of the links bearing flat in engagement with the side surfaces of the section end parts 60. The peening operation will preferably draw the surfaces of the links and plate portions 60 into firm face engagement and will hold them in such face engagement so that the adjacent ring sections will be held firmly against displacement relative to each other in any direction under normal conditions. Thus a plurality of ring sections are assembled fixedly in such a manner that they form a sub-assembly constituting preferably half a ring.

In the process of assembling the ring sections and the links, the parts will preferably be held in a jig or fixture which will insure proper orientation of all the parts so that the ends 60 of the interconnected sections will all lie in a common plane, and the walls 40 will lie in the same frusto conical arrangement. By this means the various sections of the ring in such sub-assembly are maintained in proper alignment and planar relation and are held in desired circumferential relation, that is, they are held to form a ring section of desired curvature or radius. It will be understood that the ring sections employed to form a ring of any given size will have an inner curvature at the surface 44 corresponding to the size of the bell of a pipe to be engaged thereby.

End fixtures 80 of the character best illustrated in Figs. 6 and 7 are mounted upon each end of each ring sub-assembly, as illustrated in Fig. 2. Each end fixture is preferably a unitary casting having an end wall 82 adapted to be positioned substantially radially and outwardly from the ring section on which the fitting is mounted. This wall has a central aperture 84 which preferably is of rectangular or other non-circular shape. A plurality of walls project from the wall 82 and cooperate to define a substantially tubular portion of non-circular shape. These wall portions include, as here illustrated, a comparatively narrow outer wall 86, substantially parallel side walls 88, and an inner wall 90. The walls 86 and 90 preferably diverge from the wall 82, as best seen in Fig. 6, and are of tapered shape so as to extend from the end of the comparatively short outer wall 86 to the end of the comparatively long inner wall 90.

A pair of leg portions 92 extend in substantially parallel relation from the inner wall 90 and are spaced apart a distance slightly greater than the thickness of the plate portion 60. The legs are of the shape best illustrated in Fig. 6, having a reduced width portion defined by an edge surface 94 extending angularly inwardly from the plate 82 to a hook portion 96 which is completed by an outwardly diverging edge 98 defining a toe portion at the inner margin of each leg. Flanges 100 project outwardly at the margin of each leg opposite the hook configured edge thereof; flanges 102 project outwardly across the end of each leg; and flanges 104 project from the configured margin 94, 96, 98 of each leg. Each leg preferably has a lug 106 projecting therefrom near the heel portion thereof adjacent to the junction of the flanges 100 and 102 for purposes to be described.

Figure 11:
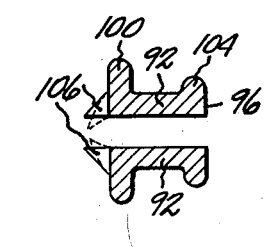
Fig. 11 is a sectional view of an end fixture taken on line 11—11 of Fig. 6.

The wall 90 is thickened at 108 between the leg portions 92 at the part adjacent the plate 82, and the inner edge of that thickened portion defines a shoulder 110. The fitting 80 is applied to the end section of the ring by positioning the legs 92 thereof astraddle the end portion 60 with the shoulder 110 thereof seating behind and engaging the shoulder 62 of the ring section. The fitting is then swung to a position causing the hook portion 96 to bear against the adjacent lug 68. When in this position the parts interlock in such a manner that endwise tension applied to the fittings, as by means of a connector bolt 112 passing through the openings 84 in adjacent fittings 80 and having a head 114 bearing against the end wall 82 of one fitting and mounting a nut 116 bearing on the end wall 82 of the other fitting, will hold the fittings 80 firmly anchored at their respective mounting ring sections. The lugs 106 may provide supplemental means for preventing removal of the fittings 80 from the ring sections, as by deforming thereof to the dotted line position shown in Fig. 11 athwart the end of the ring section in such a manner and position as to retard or resist releasing of the parts. The use of the lugs 106 is illustrative only, and it will be understood that any other type of releasable interlocking means to resist movement of the fixtures 80 upon their mounting ring sections may be provided as desired.

Assuming that ring sub-assemblies have been formed by means of the links 70 connecting the various ring sections, and that the end fixtures 80 have been mounted upon the ends of such sub-assemblies, the ring is applied to the bell of a pipe in the location illustrated in Fig. 1 and is held in pipe-encircling position by the bolts 112 and the nuts 116. The nuts 116 will be drawn up to tight condition after the ring has been assembled upon the pipe. The ring sub-assemblies will be drawn together as the nuts 116 are tightened, and, if the pipe is of the dimension normal to its size, the tightening action will terminate with the ring edge surfaces 44 of all sections engaging the surface of the bell flange 20. However, if the edges 44 of the ring sections do not fit accurately around the circumference of the pipe bell flange 20 because of inaccuracies of sizing of the pipe or inaccuracies of the sizing of the ring sub-assembly, such inaccuracies may be compensated by reorientation of the respective sections of each ring sub-assembly during final tightening of the nuts 116. Thus, if the flange 20 is of slightly smaller diameter than that in which the surfaces 44 are oriented so that the two sub-assemblies initially contact the pipe only at points thereof substantially midway between the bolt connected ends thereof, and the sections mounting the fittings 80 are spaced from the pipe when the mid-sections of the sub-assembly engage the pipe, continued tightening of the nuts 116 will draw the end sections of each sub-assembly inwardly with the lugs 68 defining fulcrums or pivots, thereby reshaping the ring sections to conform with the contour or dimension of the ring flange. Similarly, if the size of the ring sections is smaller than the bell flange 20 so that the ends of each ring sub-assembly will contact the bell flange while the central portions of the ring sub-assemblies are spaced from the bell flange, the ring sub-assemblies can be reshaped to the larger diameter by continuing the tightening of the nuts 116 after initial contact of the ends of the ring sub-assemblies with the bell flange. Such re-orientation of the various parts of the ring can be accomplished without changing the lateral orientation of the parts, and, particularly, without moving the end portions 60 of adjacent ring sections out of parallel and co-planar or aligned relation.

It is apparent from the foregoing that each of the multiple ring sections will bear upon the pipe flange, and a substantially continuous anchoring engagement of the ring with the bell flange will result. Such continuous engagement of the surfaces 44 with the bell flange provides a firm anchorage and insures that the engagement of each flange 42 with the bell flange 20 will be effective so that longitudinal pull exerted by the draw bolts 32 will not displace the sections of the anchor ring. In consequence, it is possible by the application of an equal or uniform tension at each draw bolt 32 about the circumference of a pipe sealing clamp to apply to the sealing gasket 28 an equal and uniform circumferential sealing compression. It will also be apparent that the ribs 56 increase and enlarge the bearing engagement of each ring section with the pipe flange 20 adjacent each draw bolt so as to provide required reinforcement for the anchor ring.

One of the important advantages of a ring constructed in this manner is that the openings 50 for receiving the draw bolts 32 may be spaced from the pipe bell engaging surfaces 44 only a small distance as required for the accommodation of rotation of the nuts 36 bearing against the anchor ring to draw upon the gasket ring 30. The maintenance of this dimension as small as possible is important from the standpoint of reducing to a minimum the angle of displacement of the draw bolts 32 from a position aligned with the axis of the pipe 10. Thus it will be seen in Fig. 1 that the draw bolt 32 extends at only a very small angle with relation to the pipe 10.

The construction of each of the components of the finished ring, and in particular each of the ring sections, the links and the end fixtures 80, is such that the parts may be taken at random from a supply and assembled in the desired relation without requiring special fitting of the parts to produce a ring of desired properties. It will be noted in this connection that the construction of the ends of the ring sections is the same, and that the construction of the ends of the links is the same. It will also be noted with respect to the fixtures 80 that the same construction fits upon both ends of each sub-assembly and that there is no requirement that there shall be lefts and rights or that there shall be a form of unit peculiar to any part of the ring and not uniformly applicable to all parts of the ring. Also it will be noted that each end of each ring section will serve equally as well for connection with a link or with an end fixture.

While the preferred embodiment of the invention has been illustrated and described, it will be understood that changes in the construction may be made within the scope of the appended claims without departing from the spirit of the invention.

I claim:

1. An anchor ring for a bell joint clamp, comprising a plurality of similar arcuate rigid sections, rigid links connecting groups of said sections end to end to form a plurality of substantially rigid ring sub-assemblies, rigid end fixtures mounted on the ends of each sub-assembly, and circumferentially extending draw bolts connecting the end fixtures of adjacent sub-assemblies, each ring section having a pair of radially spaced projections at each end thereof, each end fixture having a shoulder in hooked engagement with the outermost projection and a portion bearing against the other projection to limit relative movement of said end fixture and ring section in one circumferential direction about said hooked parts as a center.

2. An anchor ring for a bell joint clamp, comprising a plurality of similar arcuate rigid sections, rigid links connecting groups of said sections end to end to form a plurality of substantially rigid ring sub-assemblies, rigid end fixtures mounted on the ends of each sub-assembly, and circumferentially extending draw bolts connecting the end fixtures of adjacent sub-assemblies; each ring section having a shoulder at its outer margin adjacent each end thereof, a stud projecting laterally from each end portion of each ring section spaced from and adjacent to a shoulder and intermediate the inner and outer margins of said ring section, each end fixture having a bifurcated portion straddling an end portion of a ring section to bear against said stud, and having an abutment at said bifurcated portion in hooked engagement with said shoulder to limit relative movement of said end fixture and ring section in one circumferential direction about said studs as a center.

References Cited in the file of this patent

UNITED STATES PATENTS

| | | |
|---|---|---|
| 321,260 | Tillotson | June 30, 1885 |
| 940,098 | Wehrle | Nov. 16, 1909 |
| 1,057,499 | Renholtsen | Apr. 1, 1913 |
| 1,290,590 | Lehew | Jan. 7, 1919 |
| 1,412,562 | Matuschak | Apr. 11, 1922 |
| 1,951,034 | Norton | Mar. 13, 1934 |
| 2,076,876 | Boughton | Apr. 13, 1937 |
| 2,079,731 | Clark | May 11, 1937 |
| 2,140,939 | Merrill et al. | Dec. 20, 1938 |
| 2,183,551 | Dold | Dec. 19, 1939 |

FOREIGN PATENTS

| | | |
|---|---|---|
| 402,490 | Great Britain | Dec. 7, 1933 |